United States Patent [19]
Jeanmaire

[11] 3,820,197
[45] June 28, 1974

[54] MACHINE FOR OPENING COTTON BALES

[76] Inventor: Walter Jeanmaire, Fabrikstr. 17, 809 Kollnau, Germany

[22] Filed: Nov. 21, 1967

[21] Appl. No.: 684,833

[30] Foreign Application Priority Data
Nov. 21, 1967  Germany.................................. 32579

[52] U.S. Cl. .................................................. 19/80
[51] Int. Cl. ............................................. D01g 7/04
[58] Field of Search .................................. 19/80, 81

[56] References Cited
UNITED STATES PATENTS
3,208,106  9/1965  Leineweber, Jr. et al. ............. 19/80
3,381,341  5/1968  Platt et al. .............................. 19/80

FOREIGN PATENTS OR APPLICATIONS
946,333  1/1964  Great Britain ......................... 19/80
121,365  4/1958  U.S.S.R. ................................. 19/80

OTHER PUBLICATIONS
Saco–Lowell Bulletin, June, 1951 page 24.

Primary Examiner—Dorsey Newton
Attorney, Agent, or Firm—Burgess, Dinklage & Sprung

[57] ABSTRACT

Apparatus for opening a plurality of bales including an aligned first series of conveyor belts adapted to reciprocate in the aligned direction in such timed sequence that the last belt in the direction of movement is the first belt to move in that direction; opening means disposed between a plurality of said belts adapted to pick material from the bottoms of bales disposed on said belts during reciprocation; and control means operatively associated with the downstream most conveyor belt and bale carried thereby which control means, upon completion of the opening of the downstream most bale, is adapted to cause the remaining bales to move downstream by one conveyor belt length and adapted to cause an additional bale to be positioned on the upstream most conveyor belt.

1 Claim, 1 Drawing Figure

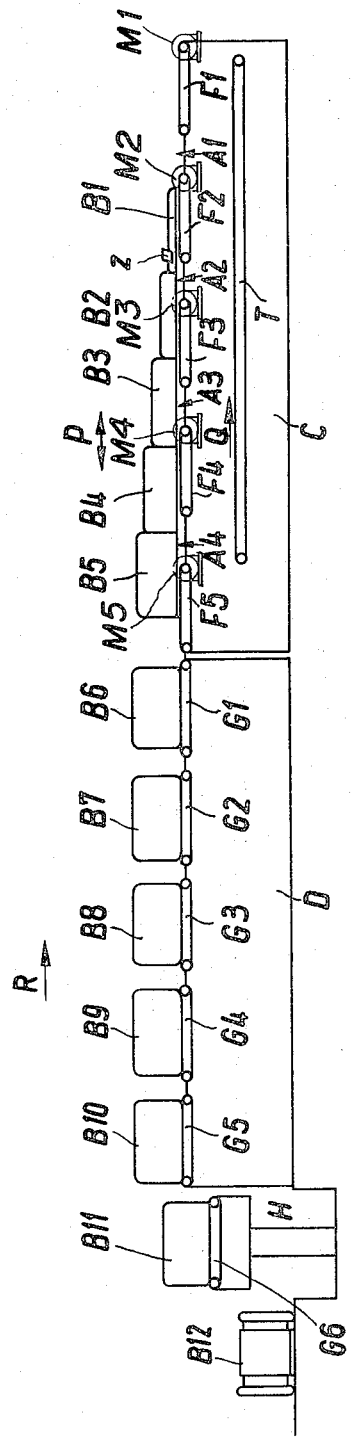

MACHINE FOR OPENING COTTON BALES

This invention relates to bale opening machines. It more particularly refers to automated bale opening machines.

It is known to provide bale opening machinery and equipment having a plurality of conveying belts each of which carries a bale. In this equipment, the conveying belts reciprocate, generally as a unit, thus causing the bales to pass over the space between the belts. A picking means is located in this space which removes the cotton or other material from the bale as such passes thereover. This type of device is shown in British Pat. No. 1001228.

The object of the present invention is to automate the feed to such machines in order to prevent such from operating at times on different numbers of bales which is not only uneconomical but also, in particular, leads to an undesired lack of uniformity in the quantity of tufts delivered per unit of time.

Another object of the invention is to provide an apparatus which will permit each bale to remain untethered for several hours previously, freed from their ties, to relax and adapt themselves to the climate in the room, thereby permitting easier picking of the contents thereof.

Other and additional objects of this invention will become apparent from a consideration of this entire specification including the claims and drawing hereof.

In accord with and fulfilling these objects, one aspect of this invention resides in improvements in the above-described known apparatus wherein the plurality of conveyor belts are reciprocated sequentially in such manner that the conveyor belt which is most rearward in relation to each reciprocal movement is the first belt to move in that movement with the successively more forward belts initiating movement in a sequential fashion. A further improvement resides in the provision of a control means operatively associated with the downstream-most conveyor belt and with the bale thereon, which operates to advance the bales downstream by one conveyor belt length as the downstream-most bale becomes completely open. Further, this control means may cause an additional bale to be placed on the upstream-most conveyor belt so as to maintain continuous production and bale opening.

This invention envisions the use of substantially any control means, such as for example a photoelectric device, a weighing device, a lever arm, etc. Of the many different devices which can be used and which are available to the art, a photoelectric means is preferred.

The forward movement of the conveyor belts of the machine preferably does not take place simultaneously but rather sequentially in such a manner that the conveyor belt which carries the bale conveyed the shortest distance is first moved, while the rearward movement commences at the conveyor belt on which the bale which has been conveyed the furthest lies.

The number of conveyor belts of this feeding device is substantially unlimited and may be selected in accordance with the existing conditions. If, for instance, the bale opening machine has seven opening devices arranged one behind the other and therefore the groups of bales moved back and forth over them consist of nine or 10 bales, and if the opening of one bale takes, for instance, 8 hours, then equipping the feeding device with eight conveyor belts located one behind the other will lead to the bales being relaxed and conditioned for 64 hours on the conveyor belts.

Understanding of this invention will be facilitated by reference to the accompanying drawing in which a single FIGURE is a schematic view of the apparatus of this invention.

Referring now to this drawing, there is shown

A machine C for opening cotton bales having a plurality of conveyor belts $F1 - F5$ located one behind the other in the direction of conveyance with devices $A1 - A4$ for opening the bales being located between them. A cotton bale $B1 - B5$ rests on each conveyor belts $F1 - F5$. The conveyor belts are driven in the manner that the bales $B1 - B5$ are moved continuously back and forth in the direction indicated by the double-headed arrow P over the opening devices $A1 - A4$ in such a manner that the bales lie close together. For this purpose, the drives of the conveyor belts $F1 - F5$ are driven in such a manner that upon movement to the right the movement of the belt F5 starts earlier than that of the belt F4, the movement of the belt F4 starts earlier than that of the belt F3, etc., and that upon movement to the left the movement of each belt which is further to the right starts moving before the adjacent belt which is further to the left. During the back and forth movement, the bales are gradually opened from their bottom side by the devices $A1 - A4$. Of the bales $B1 - B5$ worked on the machine C, the bale B1 which is located furthest to the right and, since it has been worked for the longest time, is broken down most, while the others are progressively less broken down the further to the left they lie. As soon as the bale B1 is completely opened, it must be replaced by a new bale B6 which is placed onto the machine C from the left-hand side and therefore comes against the bale B5. The cotton opened by the devices $A1 - A4$ drops onto a conveyor belt T which conveys the cotton tufts away in the direction indicated by the arrow Q. Such machines are in themselves known.

In accordance with the invention, the machine C is provided with a photocell Z which lies in the path of movement of the bales.

The photocell Z is so arranged that the beam of light associated with it is covered by the bale B1 which has been worked down to the greatest extent when the bales $B1 - B5$ reach the extreme left position upon their forward and backward movement. The photocell Z is thus subjected to the beam of light only when the bale B1 has been completely opened. Furthermore, in front of the conveyor belt F5 there is arranged a device D which bears a plurality of conveyor belts $G1 - G5$ located one behind the other with one cotton bale $B6 - B10$ each. In front of the first conveyor belt G6, as seen in the direction of conveyance R, there is arranged a lifting device H with a conveyor belt G6 which bears a bale B11. In front of this lift device H there is shown a cotton bale B12 which is still tied.

The photocell Z lies in the circuit of the motor of the conveyor belt G1 in such a manner that the current for the motor is connected when the beam of light impinges upon the photocell Z. The motor then moves the conveyor belt G1 by a predetermined length in the direction indicated by the arrow R so that the bale B6 is brought onto the conveyor belt F5 of the machine C. At the same time or thereafter, the conveyor belts $G2 - G5$ are driven for such a period of time that all bales 87 – B10 are conveyed onto the next conveyor belt G1 – G4 to the right.

In order to again bring a bale onto the conveyor belt G5 which has thus become free, the lifting device H is provided. The bale B12 which is to be brought onto the lifting device is freed of its ties and then pushed, for instance, onto the conveyor belt G6 of the lifting device H while the lifting device H is in its lower position. After the lifting device H has then been brought — for instance, hydraulically — into its upper position in which the conveyor belt G6 lies in the same plane as the conveyor belt G5, the bale can be transported by movement of the belt G5 and of the belt G6 in the direction indicated by the arrow R. Instead of a lifting device, there may be provided, for instance, a conveyor belt which conveys obliquely from the bottom up to the height of the conveyor belt G5, or else all or some of the conveyor belts G1-G5 can be arranged in a plane rising up to the conveyor belt F5 of the machine C.

The series of conveyor belts G1–G5 can also extend at right angle so that the bales are conveyed in longitudinal direction by a part of the conveyor belts and in transverse direction by another part.

The apparatus of the present invention is provided with reciprocating means which are adapted to sequentially initite reciprocation of the conveyor belts, particularly the downstream conveyor belts, in such manner that the rearward-most belt in the direction of each reciprocating movement is first to be moved. To that end, motors M 1 – M 5, inclusive, are provided which operate at different time intervals on their respective conveyors so that the rearward-most belt in the direction of each reciprocating movement is first to be moved. These motors can move sequentially time-wise in response to suitable timing means such as a timer.

What is claimed is:

1. In a bale opening apparatus comprising a plurality of aligned conveyor belts, a plurality of bale opening means disposed between adjacent conveyor belts, means for reciprocating said conveyor belts whereby bales resting thereon are reciprocated in operative relation to said opening means in such manner as to open said bales therewith; control means associated with the downstream-most conveyor belt and bale thereon which, upon sensing completion of the opening of said downstream-most bale, causes the remaining bales to move downstream one conveyor belt length and causes a new, previously untied bale to be positioned on the upstream-most conveyor belt; the improvement which comprises a multiplicity of streamwise aligned pre-opening conveyor belts upstram of, streamwise aligned with and proximate to the upstream-most conveyor belt having bale-opening means associated therewith, wherein each of said pre-opening conveyor belts supports a bale and wherein said control means is operatively connected to all of said pre-opening and bale opening means-associated-conveyor belts and causes a bale on the downstream-most of said pre-opening conveyor belts to be transferred to the upstream-most of said opening means-associated conveyor belts, causes the downstream movement of bales onto the next successive downstream-most conveyor belt and causes a fresh bale to be placed upon the downstream-most pre-opening conveyor belt in an untied condition, said reciprocating means adapted to sequentially initiate reciprocation of said conveyor belts in such manner that the rearward-most belt in the direction of each reciprocating movement is first to be moved.

* * * * *

UNITED STATES PATENT OFFICE
CERTIFICATE OF CORRECTION

Patent No. 3,820,197          Dated June 28, 1974

Inventor(s)  WALTER JEANMAIRE

It is certified that error appears in the above-identified patent and that said Letters Patent are hereby corrected as shown below:

Item [76] delete "Fabrikstr. 17, 809 Kollnau, Germany" and in lieu thereof insert -- Kollnau/Schwarzwald, Germany --.

Item [30] change "Nov. 21, 1967" to -- November 25, 1966 --.

Signed and sealed this 15th day of October 1974.

(SEAL)
Attest:

McCOY M. GIBSON JR.                C. MARSHALL DANN
Attesting Officer                  Commissioner of Patents